United States Patent [19]

Fujii

[11] 4,206,467
[45] Jun. 3, 1980

[54] RECORDING METHOD
[75] Inventor: Tadashi Fujii, Yokohama, Japan
[73] Assignee: Ricoh Co., Ltd., Japan
[21] Appl. No.: 912,318
[22] Filed: Jun. 5, 1978
[30] Foreign Application Priority Data
  Jun. 13, 1977 [JP]  Japan .................................. 52/68837
[51] Int. Cl.$^2$ ............................................ G01D 15/16
[52] U.S. Cl. ........................ 346/140 R; 101/DIG. 13; 346/153
[58] Field of Search ....................... 346/140 R, 153, 1; 101/DIG. 13

[56] References Cited

U.S. PATENT DOCUMENTS

| | | | |
|---|---|---|---|
| 2,143,376 | 1/1939 | Hansell | 346/140 R X |
| 2,487,865 | 11/1949 | Glassey | 346/139 R X |
| 3,052,213 | 9/1962 | Schaffert | 101/DIG. 13 |
| 3,341,859 | 9/1967 | Adams | 346/140 R |
| 3,666,966 | 5/1972 | Buss | 346/140 R X |
| 4,047,185 | 9/1977 | Phillips | 346/140 R X |

Primary Examiner—Joseph W. Hartary
Attorney, Agent, or Firm—McGlew and Tuttle

[57] ABSTRACT

A recording method wherein electrostatic atomization of a liquid is applied to the phenomenon that when a coloring material solution holding member is partly immersed in a solution of coloring material, the solution juts up from the surface thereof in accordance with the affinity of the material of the coloring material solution holding member with the solution. The coloring material solution holding member is formed of an insulating material and has strips of a conductive material arranged in spaced relation on opposite surfaces of the member in such a manner that the strips of the conductive material on opposite surfaces thereof are disposed in staggered relation. The conductive material is of the type which has high affinity with a particular solution of coloring material. The coloring material solution holding member of the aforesaid construction is used as recording electrode medium which is partly immersed in the solution of coloring material in a manner to form a certain angle with the surface of the solution. A complementary electrode having a copy sheet maintained in contact therewith and moving in one direction relative to the surface of the solution is arranged in spaced superposed relation to the coloring material solution holding member serving as recording electrode, and signal voltage pulses are impressed between the two electrode whereby an image can be recorded by virtue of the electrostatic atomization phenomenon of the solution of coloring material occurring at the surface of the solution of coloring material.

16 Claims, 9 Drawing Figures a-1 b-1 a-2 b-2

RECORDING METHOD

BACKGROUND OF THE INVENTION

1. Field of the Invention

This invention relates to recording method and more particularly to a recording method of the type in which electrostatic atomization of a liquid occurring at the surface of the liquid is applied to the phenomenon that when a coloring material solution holding member of a planar form, for example, is partly immersed in a solution of coloring material, the solution juts up from the surface thereof in accordance with the affinity of the material of the coloring material solution holding member for the solution.

2. Description of Prior Art

In one type of recording method known in the art, a solution of coloring material is shot out in fine sprays through small nozzles onto the surface of a recording medium, such as recording sheet, to record an image thereon. This method, which is generally referred to as an ink jet recording method, offers advantages in that the recording operation can be performed at high speed and with little noise and a colored image can be recorded as desired. However, this method has the defect, which is so serious that it almost defeats the method's own object, that when the nozzles are not used for performing a recording operation the solution of coloring material that remains at the forward ends thereof vaporizes and solidifies and causes obturation of the nozzles, because the nozzles have a very small diameter of about 10 to 50 microns. Various proposals have been made to provide means for avoiding obturation of the nozzles. However, no satisfactory solution to the problem has been proposed yet, so that this method has the aforesaid serious defect in spite of the attempts to eliminate same.

SUMMARY OF THE INVENTION

This invention has as its object the provision of a novel recording method which is capable of recording an image on the surface of a recording sheet by using a solution of coloring material, the method eliminating the aforesaid defect of the ink jet recording method and yet offering advantages similar to those offered by such method.

In order to accomplish the aforesaid object, this invention provides a recording method wherein a coloring material solution holding member of a planar form, for example, of an insulating material and having a plurality of strips of a conductive material having high affinity with a particular solution of coloring material attached thereto is partly immersed in the solution of coloring material and acts as a recording electrode means in a manner to form a certain angle with respect to the surface of the solution. Complementary electrode means are provided having a recording medium, such as a recording sheet, maintained in contact therewith and moving in one direction relative to the surface of the solution. This electrode is arranged in spaced superposed relation to the recording electrode means. Signal voltage pulses are impressed between the two electrode means so as to record a desired image on the surface of the recording sheet by causing the solution of coloring material to electrostatically adhere thereto.

Under certain physical conditions, application of a voltage to a certain type of liquid causes the surface of the liquid to become unstable. If minute particles of solid dust are floating on the surface of the liquid, if ripples are formed on the surface of the liquid as by wind or vibration, or if small projections extend upwardly from the liquid through the surface thereof, the liquid will jut up from the surface thereof, will be formed into a jet of filaments, or will split up in positions on the surface of the liquid where the aforesaid phenomenon takes place. This phenomenon is referred to an electrostatic atomization of liquid. This invention utilizes this phenomenon in recording an image on the surface of a recording sheet.

DESCRIPTION OF THE PREFERRED EMBODIMENT

Figure 1:
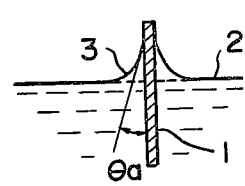
FIG. 1 diagrammatically explains the manner in which the surface of a liquid is deformed when a member which may be planar in form is partly immersed in the liquid, FIG. 1 (a-1) showing the use of a member having high affinity for the liquid and arranged perpendicular to the surface of the liquid, FIG. 1 (a-2) showing the use of a member having high affinity for the liquid and arranged in an inclined position relative to the surface of the liquid, FIG. 1 (b-1) showing the use of a member having low affinity for the liquid and arranged perpendicular to the surface of the liquid, and FIG. 1 (b-2) showing the use of a member having low affinity for the liquid and arranged in an inclined position relative to the surface of the liquid.
Figure 1:
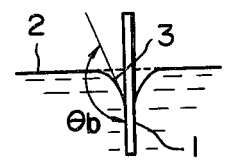
Figure 1:
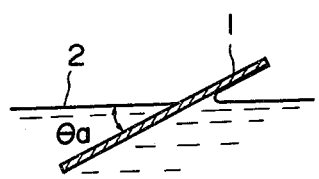
Figure 1:
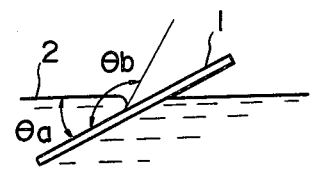

Before describing the embodiments of the invention, the principle of the invention will be outlined to enable the invention to be clearly understood. If a member 1, such as a planar member, is partly immersed in a liquid, a strain 3 caused on a surface 2 of the liquid between the member 1 and the surface 2 varies depending on the affinity of the material of the member 1 with the liquid, as shown in FIGS., 1(a-1) and 1(b-1). FIG. 1(a-1) shows the strain 3 caused on the surface 2 of the liquid when the member is formed of a material of high affinity for the liquid, while FIG. 1(b-1) shows the same phenomenon taking place when the member 1 is formed of a material of low affinity for the liquid. In FIG. 1 (a-1), the liquid is shown as rising from its surface 2 along the surfaces of the member 1, but in FIG. 1 (b-1) the liquid is shown as falling from its surface along the surfaces of the member 1.

In FIGS. 1(a-1) and 1(b-1), the member 1 is located perpendicular to the surface 2 of the liquid. In FIG. 1 (a-1), the elevated portions of the liquid surface 2 each form an angle of contact $\theta a$ with the surface of the member 1, and in FIG. 1(b-1) the depressed portions of the liquid surface 2 each form an angle of contact $\theta b$ with the surfaces of the member 1. If the member 1 is brought to a position in which it is inclined with respect to the liquid surface 2, the liquid surface 2 becomes horizontal and the strain of the liquid surface 2 completely disappears as seen in FIG. 1 (a-2) when the angle of contact between the member 1 and the liquid surface 2 is $\theta a$ in the case of the member 1 of high affinity for the liquid. However, when the material of the member 1 has low affinity for the liquid, the strain 3 of the liquid surface 2 near the upper surface of the member 1 does not disappear and rather increases as shown in FIG. 1 (b-2) as the member 1 is brought to the same inclined position as the member 1 shown in FIG. 1 (a-2). That is, the upper surface of the member 1 formed of a material of low affinity for the liquid forms the angle of contact of $\theta b$ with the liquid surface 2 which is greater than 90°, as shown in FIG. 1 (b-2).

Figure 2:
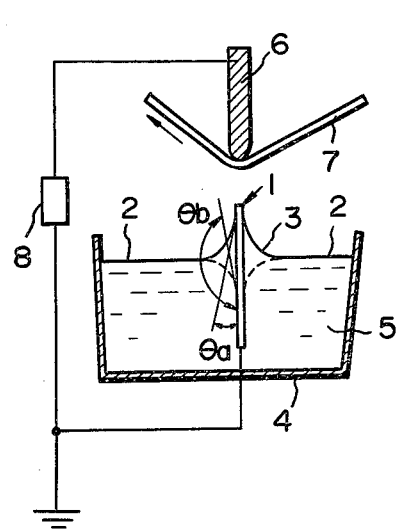
FIG. 2 is a front view of one embodiment of this invention.
Figure 3:
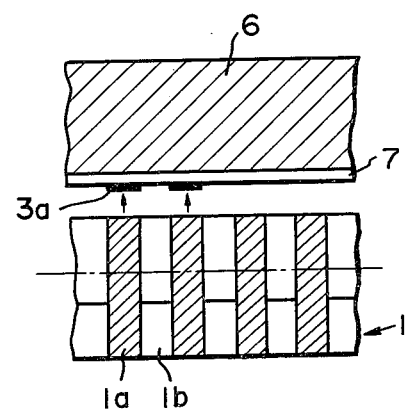
FIG. 3 is a side view of the embodiment shown in FIG. 2.
Figure 4:
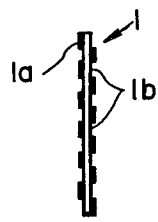
FIG. 4 is a view of the coloring material solution holding member shown in FIG. 2, as seen in the direction of one edge thereof.

The invention will now be described with reference to its embodiments shown in the accompanying drawings. FIGS. 2, 3 and 4 show one embodiment in which the member 1 is a coloring material solution holding plate of rectangular shape. In FIG. 2, a solution of coloring material 5 is contained in a vessel 4 and the coloring material solution holding member 1 is partly immersed in the solution 5 perpendicular to the surface 2 of the solution 5. In this embodiment, the coloring material solution holding member 1 of rectangular shape is formed of an insulating material, preferably polyhexafluoropropylene, polytetrafluoroethylene, polyvinilidene fluoride, etc., which has high affinity for the solution of coloring material 5. The rectangular coloring material solution holding member 1 has strips 1a of a conductive material which is a material having high affinity for the solution of coloring material 5, such as metal, arranged in spaced relation on opposite surfaces of the member 1 to extend from one longer side to the other longer side thereof in such a manner that the strips 1a of the conductive material on the opposite surfaces of the member 1 are disposed in staggered relation as viewed longitudinally of the strip from one longer side toward the other longer side of the member 1, as shown in FIGS. 3 and 4. The member 1 having the conductive strips 1a serves as recording electrode means.

The coloring material solution holding member 1 serving as recording electrode means may be made in such a manner that thin layers of a metal are formed as conductive strips 1a by plating or vaporization deposition in vacua on the opposite surfaces of the member 1 which has an insulating material at least on its surfaces. The conductive strips 1a may be provided on the opposite surfaces of the member 1 in the form of a multistylus by using a resist material in accordance with a photo-etching technique. Thus the rectangular coloring material solution holding member 1 is formed into recording electrode means having the conductive strips 1a in spaced apart from one another by insulating portions 1b on the opposite surfaces of the member 1.

Complementary electrode means 6 is arranged in spaced superposed relation to the member 1 serving as recording electrode means, and a recording sheet 7, which may be a sheet of ordinary paper, moves in one direction relative to the surface 2 of the solution 5 while being maintained in contact with the complementary electrode 6. An electric field is formed between the conductive strips 1a of the coloring material solution holding member 1 serving as recording electrode means and the complementary electrode means 6 by signal means such as a signal voltage generator 8.

A voltage is generated by the signal voltage generator 8 in accordance with electric information from a data supply source, and voltage pulses are impressed between the member 1 and the complementary electrode 6 to form an electric field therebetween. When the electric field is formed, the solution of coloring material 5 will jump upwardly or be formed into a jet of filaments extending upwardly from the strained portions of the surface 2 of the solution 5 disposed adjacent the opposite surfaces of the member 1 serving as recording electrode means. The filaments of solution 5 will be transmitted through the conductive strips 1a and adhere to the surface of the recording sheet 7 to record thereon an image 3a printed as a visible image in the solution of coloring material 5.

As shown in detail in FIG. 3, the opposite surfaces of the member 1 serving as recording electrode means have the conductive strips 1a of high affinity with the solution of coloring material 5 and the insulating portions 1b of low affinity with the solution 5 which are arranged alternately. The portions of the surface 2 of the solution 5 disposed adjacent the conductive strips 1a of the member 1 serving as recording electrode means are strained as illustrated in FIG. 1 (a-1) and are readily subjected to the electrostatic atomization phenomenon, while the portions of the surface 2 of the solution 5 disposed adjacent the insulating portions 1b of the member 1 are strained as shown in FIG. 1 (b-1) and little or no electrostatic atomization occurs therein. Thus the image 3a recorded in the solution of coloring material 5 is formed on the surface of the recording sheet 7 in regions thereof which correspond to the conductive strips 1a. The conductive strips 1a preferably have a width in the range between 60 and 130 microns in order that the image 3a recorded will be recognized as having 4-8 lines/mm upon being dissolved.

In order to obtain an image recorded in the solution of coloring material 5 on the surface of the recording sheet 7 by virtue of the electrostatic atomization phenomenon, the solution of coloring material 5 used consists of a non-conductive solvent having a high boiling point, low viscosity and a specific resistance of over $10^8 \Omega$ cm, preferably over $10^{10} \Omega$ cm, in which are dissolved a dye or a pigment and a resin serving as a dispersing or binding agent. An ink having the property of developing a color upon reaction with another substance may be used. The solvent may be benzene, toluene, nitrobenzene, carbon tetrachloride, etc. Also, the solvent may be a solvent of high boiling point deriving from petroleum, such as Isobar H, Isobar G, etc. The dye used may be not only dissolvable but also indissolvable in oil. The pigment may be either an inorganic or organic pigment, such as carbon black, iron powder, ZnO, $CaCO_3$, $TiO_2$, $Al_2O_3$, barium titanate, copper phthaloxyanine, etc. The resin used may be a toner for electrophotography or an ordinary resin used in printing ink.

Figure 5:
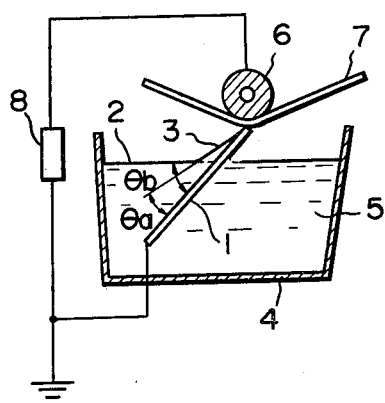
FIG. 5 is a front view of another embodiment of the invention.
Figure 6:
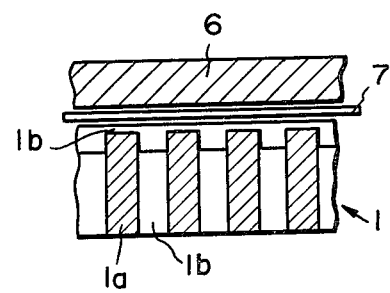
FIG. 6 is a side view of the embodiment shown in FIG. 5.

In another embodiment shown in FIGS. 5 and 6, the coloring material solution holding member 1 serving as recording electrode means is partly immersed in the solution of coloring material 5 contained in the vessel 4 in such a manner that the member 1 is inclined with respect to the surface 2 of the solution 5. In this embodiment, the coloring material solution holding member 1 has, on its upper surface alone, the conductive strips 1a arranged in the form of a multistylus, and the conductive strips 1a are located alternately with the insulating portions 1b. When the angle of contact θb formed by the insulating portions 1b and the surface 2 of the solution 5 is smaller than 90°, the coloring material solution holding member 1 is arranged in an inclined position relative to the surface 2 of the solution 5, as shown in FIG. 5. Preferably, the angle of inclination of the member 1 relative to the surface 2 of the solution 5 is equal to the angle of contact θb. When the member 1 is arranged in this manner, the strain 3 is caused only in portions of the surface 2 of the solution 5 which correspond in position to the conductive strips 1a of the member 1. As shown in FIG. 6, the coloring material solution holding member 1 is almost in contact with the recording sheet 7 which moves while being maintained in contact with the complementary electrode means 6 (which may be in the form of a roller). In this embodiment, the conductive strips 1a do not extend to the upper edge of the member 1 and there is a clearance between the upper end of each conductive strip 1a and the upper edge of the member 1. Such clearance is in the range between 50 microns and 2 mm and formed as an insulating material portion.

In the embodiment shown in FIGS. 2 to 4, a solution of reflex blue dye in carbon tetrachloride was used as the solution of coloring material 5 and a sheet of ordinary paper was used as the recording sheet 7. When the coloring material solution holding member 1 was located such that its upper edge was spaced apart from the recording surface a distance of 1.0 mm and a signal voltage of 1000 volts was impressed with a pulse duration of 170 milliseconds, a clear blue image was recorded on the recording sheet 7.

In the embodiment shown in FIGS. 5 and 6, a solution of reflex blue dye in benzene was used as the coloring material solution 5, the coloring material solution holding member 1 was immersed in the solution 5 in such a manner that the upper edge of the member 1 was spaced apart from the surface 2 of the solution 5 a distance of 1.5 mm, and the upper ends of the conductive electrodes 1a of the member 1 was spaced apart from the upper edge of the member 1 by a distance of 0.1 mm. When a signal voltage of 600 volts having a pulse duration of 140 milliseconds was impressed while the member 1 was almost in contact with the recording sheet 7 which was ordinary paper, a clear blue image was recorded.

The coloring material solution holding member 1 according to the invention can have its surfaces readily cleaned when wiped with a sponge or cloth.

Preferably the level of the surface 2 of the solution of coloring material 5 is automatically kept constant by detecting and controlling means, not shown.

Figure 8:
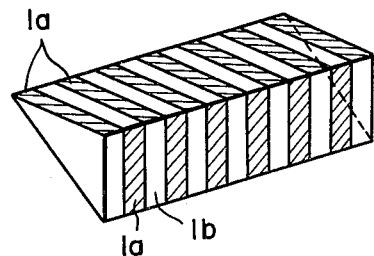
FIG. 8 is a perspective view of a modification of the coloring material solution holding member used in the invention.
Figure 7:
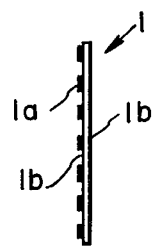
FIG. 7 is a view of the coloring material solution holding member shown in FIG. 5, as seen in the direction of one edge thereof.

The coloring material solution holding member 1 need not necessarily be planar in shape, although in the embodiments shown in FIGS. 3 to 7 the member 1 has been described as being a rectangular planar member. The invention is not limited to this shape and the member 1 may be in the form of a triangular prism as shown in FIG. 8 which has the conductive strips 1a arranged in staggered relation on the adjacent two sides thereof parallel to the ends and spaced apart from one another by the insulating portions 1b, so that the conductive strips 1a will be in the form of a multistylus. When this form of member 1 is used, the adjacent two surfaces are partly immersed in the solution 5 and inclined in such a manner that the angle of inclination of the insulating portions 1b relative to the surface 2 of the solution 5 is equal to the angle of contact θb.

In this invention, it is not necessarily essential that the strain 3 of the surface 2 of the solution 5 as shown in FIG. 1 (b-1) exist in portions of the surface 2 adjacent the insulating portions 1b of the member 1. What is required is that there is a difference, no matter how small, between the portions of the surface 2 corresponding to the conductive strips 1a and the insulating portions 1b in the degree of strain. The larger the difference in the degree of strain, the better.

The signal voltage and the signal pulse duration are influenced by the degree of strain of the surface of the solution, the size and the shape of the strain of portions of the surface of the solution corresponding to the conductive strips of the coloring material solution holding member, the distance between the recording electrode means and the specific resistance, surface tension and viscosity of the solution of coloring material.

Figure 9:
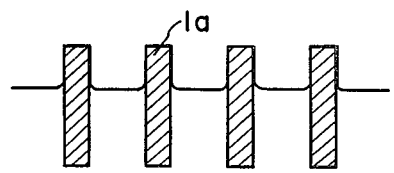
FIG. 9 shows a needle device used as recording electrode means in the invention.

The conductive strips 1a may be in the form of needles. For example, needles of a diameter of 50 to 100 microns may be arranged as shown in FIG. 9 to provide a coloring material solution holding member.

This invention offers the advantages that since no nozzles are used, no obturation of the nozzles occur, and that the same effect as achieved by the ink jet recording method can be achieved by the method according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

What is claimed is:

1. A recording method using a solution of coloring material, a coloring material solution holding member having at least two parts differing from one another in their affinity with said solution of coloring material, and complementary electrode means, said coloring material solution holding member being formed with at least one conductive portion at one of said at least two parts thereof having high affinity with said solution of coloring material and at least one insulating portion at the other part thereof having low affinity with said solution of coloring material so that the member can serve as recording electrode means, said method comprising the steps of:

alternately arranging a plurality of said conductive portions and a plurality of said insulating portions on opposite surfaces of said coloring material solution holding member;

partly immersing said coloring material solution holding member in said solution of coloring material in such a manner that said conductive portions of said member extend from the surface of said solution of coloring material;

arranging said complementary electrode means in spaced superposed relation to said coloring material solution holding member; and forming an electric field between said conductive portions of said coloring material solution holding member and said complementary electrode as a recording sheet is moved in one direction relative to the surface of said solution of coloring material while being maintained in contact with said complementary electrode, whereby portions of said solution of coloring material supported by said plurality of conductive portions of said coloring material solution holding member can be caused to flow upwardly in a jet of filaments to the surface of said recording sheet to record a visible image thereon.

2. A recording method as claimed in claim 1, wherein said coloring material solution holding member immersed in said solution of coloring material is arranged such that said plurality of conductive portions thereof are inclined with respect to the surface of said solution of coloring material.

3. A recording method as claimed in claim 1, wherein said coloring material solution holding member is formed of an insulating material and planar in shape and has said plurality of conductive portions arranged on opposite surfaces thereof in such a manner that the conductive portions on the opposite surfaces are disposed in staggered relation.

4. A recording method as claimed in claim 1, wherein said complementary electrode is planar in shape.

5. A recording method as claimed in claim 1, wherein said complementary electrode comprises a roller.

6. A recording method as claimed in claim 1, wherein said coloring material solution holding member is formed of an insulating material and in the form of a triangular prism and has said plurality of conductive portions arranged in staggered relation on the adjacent two sides thereof projecting upwardly from the surface of said solution of coloring material.

7. A recording method as claimed in claim 1, wherein said coloring material solution holding member is in the form of a multistylus comprising a plurality of needle electrodes spaced apart from one another and partly immersed in said solution of coloring material.

8. A recording medium as claimed in claim 1, wherein said coloring material solution holding member immersed in said solution of coloring material is arranged such that said plurality of conductive portions thereof are perpendicular with respect to the surface of said solution of coloring material.

9. A recording apparatus comprising, a container containing a coloring material solution having a surface level in said container, a recording electrode partially immersed in said solution and extending outwardly from said surface level, a conductive portion on said recording electrode having high affinity for said solution partially immersed in said solution and extending outwardly of the surface level of the solution, said recording electrode comprising an insulative member having a plurality of said conductive portions thereon, the affinity of said insulative member for said solution being low and less than the affinity of said conductive portion for said solution, said plurality of conductive portions being spaced along said insulative member and each being partially immersed in said solution and extending outwardly from said surface level thereof, a complementary electrode spaced from an edge of said conductive portions extending out of said solution, and electric signal means connected between said conductive portions and said complementary electrode for establishing a signal voltage therebetween, whereby a recording medium is fed between said complimentary electrode and at least one of said conductive portions and solution is entrained up the surface of at least one of said conductive portions and onto the recording medium by the signal voltage applied.

10. A recording apparatus according to claim 9, wherein said conductive portions extend in parallel to each other and are of a width of between about 60 to 130 microns each.

11. A recording apparatus according to claim 9, wherein said conductive portions are arranged on either side of said insulative member in parallel orientation to each other and staggered from each other on either side of said insulative member.

12. A recording apparatus, according to claim 9, wherein said conductive portions are arranged in parallel on one side of said insulative member and said insulative member is immersed in said solution at an acute angle to said surface level, each of said conductive portions being spaced from an edge of said insulative member adjacent said complementary electrode.

13. A recording apparatus according to claim 9 wherein said insulative member is of a triangular prism shape having said conductive portions arranged on two sides of said triangular prism facing said complementary electrode and staggered with each other on said two sides.

14. A recording apparatus according to claim 12 wherein the end of each of said conductive portions is spaced from the end of said conductive member adjacent said complementary electrode by between about 50 microns to about 2 mm.

15. A method of recording a visual image on a recording medium with a colored solution comprising, partially immersing a recording electrode having an insulative portion and an adjacent conductive portion into the colored solution, the affinity of the conductive portion of the recording electrode for the colored solution being greater than the affinity of the insulative portion of the recording electrode for the colored solution, positioning a complementary electrode adjacent an edge of the recording electrode extending out of the colored solution, applying a signal voltage between the conductive portion of the recording electrode and the complementary electrode to entrain colored solution along the surface of the conductive portion and jut it toward the complementary electrode, and feeding the recording medium between the complementary electrode and the recording electrode to pick up the jutted colored solution and form a visual image thereon.

16. A method according to claim 15, wherein the voltage signal applied to the conductive portion is controlled by an information source for applying a pattern to the recording medium.

* * * * *